United States Patent
Holt et al.

(10) Patent No.: US 6,800,207 B2
(45) Date of Patent: Oct. 5, 2004

(54) METHOD AND APPARATUS FOR CONTROLLING WATER SYSTEM FOULING

(75) Inventors: William Holt, Seabrook, TX (US); John V. Kraft, Lipan, TX (US)

(73) Assignee: Jay V. Kraft, Lipan, TX (US)

( * ) Notice: Subject to any disclaimer, the term of this patent is extended or adjusted under 35 U.S.C. 154(b) by 247 days.

(21) Appl. No.: 10/134,354

(22) Filed: Apr. 27, 2002

(65) Prior Publication Data

US 2003/0201234 A1 Oct. 30, 2003

(51) Int. Cl.[7] .................................................. C02F 1/46
(52) U.S. Cl. ...................... 210/748; 210/764; 210/95; 210/205; 210/243; 204/273; 205/742
(58) Field of Search ................................ 210/748, 764, 210/787, 95, 192, 198.1, 205, 243, 512.1, 512.2; 204/273, 280, 286.1, 287; 205/742

(56) References Cited

U.S. PATENT DOCUMENTS

| | | | | |
|---|---|---|---|---|
| 3,425,925 A | * | 2/1969 | Fleischman | 204/196.15 |
| 4,525,253 A | * | 6/1985 | Hayes et al. | 210/748 |
| 4,936,979 A | * | 6/1990 | Brown | 210/85 |
| 5,094,739 A | * | 3/1992 | Kump | 205/745 |
| 5,753,100 A | * | 5/1998 | Lumsden | 205/701 |
| 5,948,279 A | * | 9/1999 | Chang et al. | 210/808 |
| 6,350,385 B1 | | 2/2002 | Holt et al. | |

* cited by examiner

*Primary Examiner*—Frank M. Lawrence
(74) *Attorney, Agent, or Firm*—Joseph S. Heino; Patrick M. Bergin

(57) ABSTRACT

A method and apparatus for turbulently exposing water flowing through a water system to a plurality of electrodes of an ion generator and having a self-contained tank through which water flows is provided with an inlet pipe that directs water flow between the electrodes. A tank cover serves as a non-electrical conducting head for the plurality of electrodes that extend downwardly from the underside of the cover. The electrodes are functionally configured to maximize water flow between them. Following the flow of water between the electrodes, a double vortex of water flow is created along one wall of the tank. A sight glass allows for visualization of the container contents, and in particular electrode wastage or wear, during operation.

2 Claims, 2 Drawing Sheets

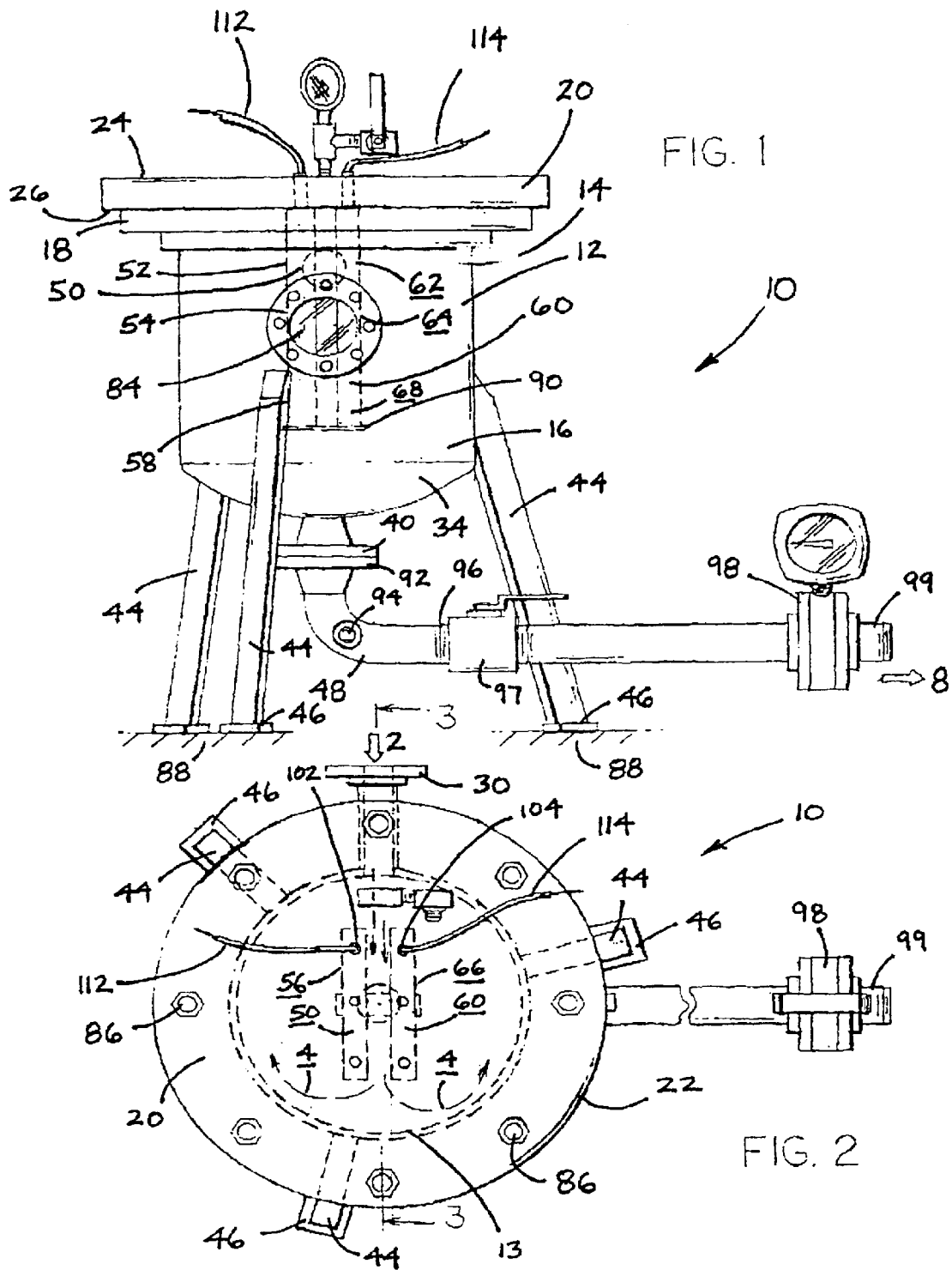

METHOD AND APPARATUS FOR CONTROLLING WATER SYSTEM FOULING

FIELD OF THE INVENTION

This invention relates generally to methods and devices used with water systems. More particularly, it relates to an improved method and apparatus for exposing water, flowing through a water system, to an ion generator whereby ions are fed into the water flow to prevent fouling of the water system by algae, nuisance invertebrates, microorganisms, and inorganic salts. This invention also specifically relates to an improvement of the inventors' method and apparatus disclosed and claimed in U.S. Pat. No. 6,350,385.

BACKGROUND OF THE INVENTION

It has long been known that algae, nuisance invertebrates, microorganisms, and inorganic salts may foul water systems and lead to very significant water system inefficiencies. These inefficiencies result in increased energy consumption and increased maintenance demands that, in turn, increase overall operational and maintenance costs by several orders of magnitude. Ion generators have been employed in previous attempts to control algae, nuisance invertebrates, and microorganisms. Such ion generators are based on well-known principles of electrochemical reactions, one of which is referred to as electrolysis.

Electrolysis is an electrochemical process by which electrical energy is used to promote chemical reactions that occur on the surface of functionally cooperating electrodes. One electrode, called the anode, involves the oxidation process where chemical species lose electrons. A second electrode, called the cathode, involves the reduction process where electrons are gained. In water, for example, oxygen is generated at the anode and hydrogen is generated at the cathode. The generation of hydrogen and oxygen in fresh water by the process of electrolysis will be weak due to the low electrical conductivity of the water. The oxygen generated aids in the prevention of the deposit of inorganic salts on the electrodes. The function of an ion generator is also to produce metal ions, typically copper ions or silver ions. Metal ion production is accomplished by use of an electrically charged metal anode that comprises atoms of the metal ions that are to be generated. It is the purpose of the ion generator to feed the metal ions out of the generator before they can be deposited on a cathode. The metal ions and oxygen, both of which are produced by the ion generator, are feed into the water stream of the water system to prevent fouling of the system by algae, nuisance invertebrates, microorganisms, and inorganic salts. As previously mentioned, one such system was devised by these inventors and is the subject of U.S. Pat. No. 6,350,385 issued to Holt, et al.

The toxicity of copper and silver to aquatic organisms is well established although the exact mechanism is not well defined. In general, these heavy metals must be in an ionic form in order for them to be toxic to invertebrates, microorganisms and algae. The eradication of microorganisms is attributed to positively charged ions that are both surface active and microbiocidal. These ions attach themselves to the negatively charged bacterial cell wall of the microorganism and destroy cell wall permeability. This action, coupled with protein denaturation, induces cell lysis and eventual death. One advantage to the use of metal ionization is that eradication efficacy is wholly unaffected by water temperature. Chlorine, a commonly used antifouling chemical, is somewhat temperature dependent. Furthermore, the metal ions actually kill the microorganisms, and other microorganism promoting bacteria and protozoa, rather than merely suppress them, as in the case of chlorine. This minimizes the possibility of later recolonization. Other advantages of metal ionization compared to other eradication techniques include relatively low cost, straightforward installation, easy maintenance, and the presence of residual disinfectant throughout the system.

A copper or silver ion generator is, by way of specific example, an effective method for controlling legionella which is likely to be present in most water systems. Legionella is predominantly present in water cooling systems in microbial biofilms which become attached to surfaces submerged in the aquatic environment. These biofilms are typically found on the surfaces of pipes and stagnant areas of the water cooling system. Many components of most any man-made water system can be considered to be an amplifier for the organism (i.e., the organism can find a niche where it can grow to higher levels, or be amplified) or a disseminator of the organism. Examples of man-made amplifiers include cooling towers and evaporative condensers, humidifiers, potable water heaters and holding tanks, and conduits containing stagnant water. Showerheads, faucet aerators, and whirlpool baths may serve as amplifiers as well as disseminators. Human infection from exposure to legionella, or legionosis, can result in a pneumonia illness that is commonly referred to as Legionnaire's disease, namesake of the famous 1976 outbreak in Philadelphia. Since that outbreak, about 1,400 cases are officially reported to the Center for Disease Control annually.

Other bacteria and protozoa can also colonize water cooling system surfaces and some have been shown to promote legionella replication. Amoebae and other ciliated protozoa are natural hosts for legionella. Legionella multiply intracellularly within amoebae trophozoites. *Legionella pneumophila* is known to infect five different genera of amoebae, most notably *Hartmanella vermiformis* and Acanthamoeba. Legionella can also multiply within the ciliated protozoa, Tetrahymena. Bacterial species that appear to provide legionella with growth-promoting factors include Pseudomonas, Acinetobactor, Flavobacterium, and Alcaligenes. Copper and silver ions are an effective method of control for each of these bacteria and protozoa. The controlled release of copper or silver ions has also been known to serve as an effective attachment and growth control for such marine organisms as algae, mussels, oysters and barnacles. Such ions can eliminate and control algae, for example, by inhibiting photosynthesis which leads to its demise.

In the experience of these inventors, users of present metal ion generators in industrial cooling water systems have reported problems such as bridging which leads to electrical shorting, electrical conductivity stratification which results in uneven electrode erosion, and plating of metal on the cathode. Bridging occurs because of the necessity of placing the anode and cathode in close proximity to one another in fresh water systems. One way of dealing with this problem is to periodically reverse polarity of the electrodes. Uneven electrode erosion due to electrical conductivity stratification occurs for the reason that nonuniform water flow occurs between electrodes. In present designs, the velocity of the water that flows between the electrodes is not generally constant over the electrode face. This leads to stratification of inorganic materials in the water that, in turn, produces electrical conductivity stratification. Finally, plating of the metal anode material on the cathode, as previously mentioned, completely defeats the purpose of the ion generator in the present application. When plating occurs, the metal ions are deposited on the cathode rather than being introduced into flow stream that is to be treated. In the experience of these inventors, each of these problems is related to water flow and to electrode spacing, which is required to be very close in fresh water systems. The spacing of the electrodes in close proximity to each other in fresh water systems is required if power system expectations are to be within reason, on the order of a few hundred watts. The system simply will not be economical if maximum power requirements exceed several kilowatts.

SUMMARY OF THE INVENTION

It is, therefore, a principal object of this invention to provide an improved method and apparatus for exposing the water flow within a water system to an ion generation device wherein water velocity is increased between the electrodes of the ion generator. It is another object of this invention to provide such an improved method and apparatus where a water inlet is provided to create a high velocity flow within the system, which flow is directed between the ion generating electrodes. It is yet another object to provide such an improved method and apparatus where a double vortex flow is created following water flow from between the electrodes. It is yet another object to provide such an improved method and apparatus which avoids "dead zones," or areas where water velocities in the vicinity of the ion generator electrodes are low. It is still another object to provide such a method and apparatus in which a non-electrical conducting head is used to mount the electrodes of the ion generator and where a plurality of cooperatively alternating anodes and cathodes may be used. It is another object of the present invention to provide such an improved method and apparatus in which polarity of the electrodes is periodically reversed. It is yet another object of the present invention to provide such an improved method and apparatus in which a discharge valve is provided to control the system water level within the ion generator thereby maintaining a minimum vertical velocity within the system. It is still another object to provide a self-cleaning elliptical or conical base to the flow tank. It is yet another object to provide such an improved method and apparatus wherein a sight glass is utilized to allow for visual inspection of anode wastage. It is still another object to provide such an improved method and apparatus wherein performance is optimized while manufacturing costs are not increased significantly.

The present invention has obtained these objects. It overcomes problems and disadvantages of prior systems by providing an improved method and apparatus in which water flowing through a water system is vigorously and turbulently exposed to a plurality of electrodes of an ion generator whereby ions that are generated are fed into the water flow to prevent fouling of the water system by algae, nuisance invertebrates, microorganisms, and inorganic salts. The present invention accomplishes this by providing an ion generator having a self-contained tank through which the water flows. The generally cylindrical containment tank includes an inlet pipe at the uppermost portion of the tank. An elliptical tank base includes an outlet pipe in combination with a tank clean out device at the lowermost portion of the tank. A tank cover is provided which serves as the non-electrical conducting head for a plurality of electrodes that extend downwardly and generally parallel to one another from the underside of the cover. When the tank cover is in place in its normal operating position, the electrodes are suspended from the tank cover within the containment tank. The inlet pipe is functionally configured to introduce water directly between the electrodes. The electrodes are functionally configured, both in size and placement, to maximize water flow between them, thereby creating a double vortex flow following water flow between the electrodes. Circuitry is provided to allow for periodic reversal of polarity of the electrodes. A sight glass is provided within the containment tank to allow for visualization and monitoring of the container contents, and in particular anode wastage or wear, during operation. The foregoing and other features of the improved method and apparatus of the present invention will be apparent from the detailed description that follows.

BRIEF DESCRIPTION OF THE DRAWINGS

FIG. 1 is a front elevational view of the improved water system fouling control apparatus constructed in accordance with the present invention.

FIG. 2 is a top plan view of the improved water system fouling control apparatus shown in FIG. 1.

DETAILED DESCRIPTION

Figure 3:
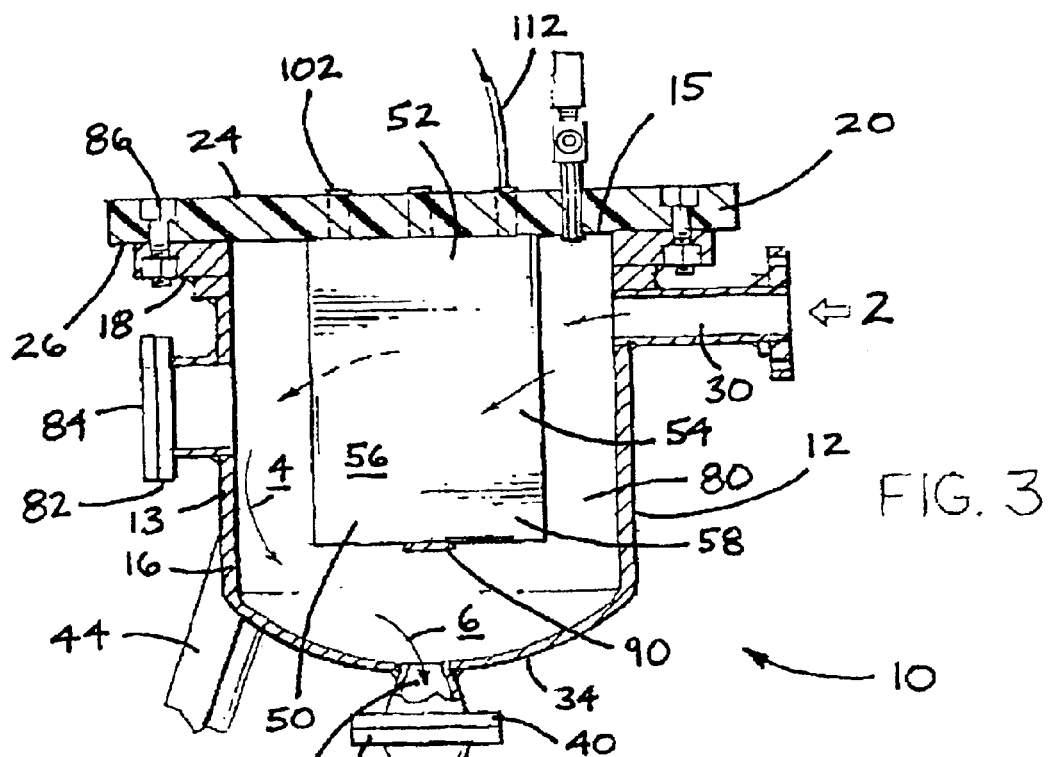
FIG. 3 is a partially sectioned front elevational view of the improved water system fouling control apparatus shown in FIG. 1 and taken along line 3—3 of FIG. 2.

Referring now to the drawings in detail, wherein like numerals represent like elements throughout, FIG. 1 illustrates a preferred embodiment of a device that utilizes the improved method and apparatus of the present invention.

Figure 4:
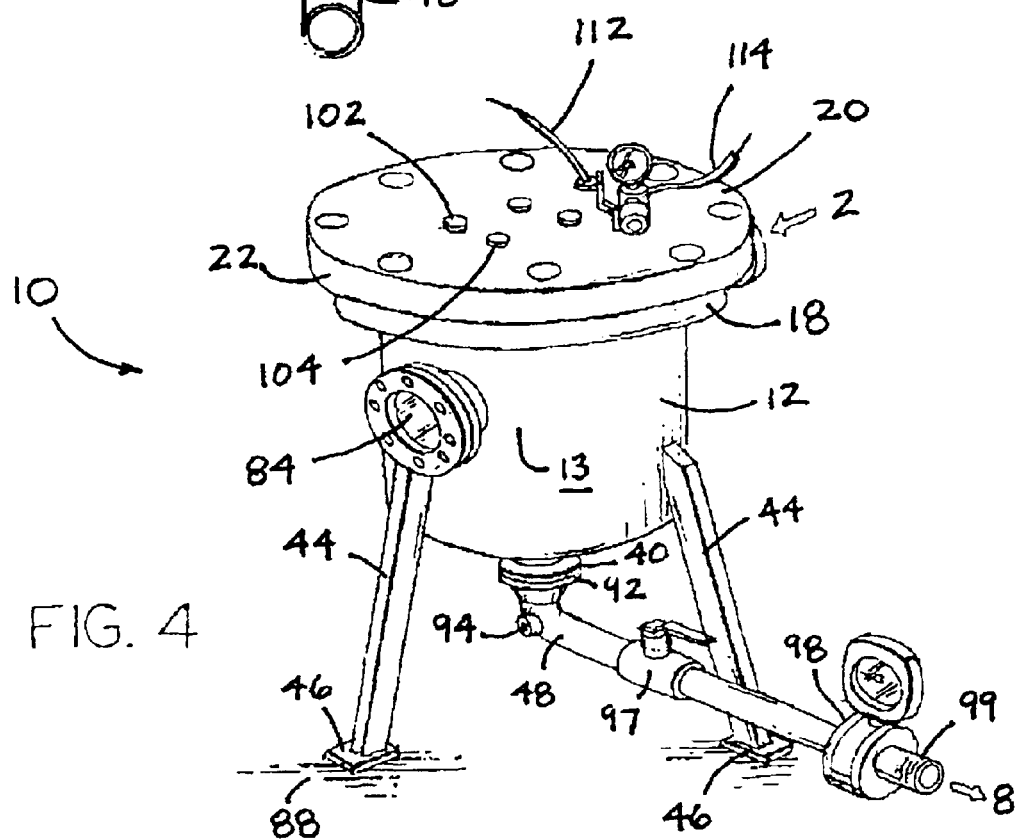
FIG. 4 is a front, top and right side perspective view of the improved water system fouling control apparatus shown in FIG. 3.

An ion generator apparatus, generally identified 10, includes a containment tank 12 that is generally cylindrical in physical configuration. The containment tank 12 includes an upper tank portion 14 and a lower tank portion 16 and is constructed of stainless steel in the preferred embodiment, although the material is not a limitation of this invention. The tank 12 also includes an upper tank portion aperture 15 and, situated about the perimeter of the upper tank portion aperture 15, an upper tank flange 18. The containment tank 12 is supported about its outer perimeter by a plurality of support legs 44, each support leg 44 being attached to the tank 12. Each leg 44 also includes a support foot 46 that rests upon a generally horizontal surface 88. As shown in FIGS. 2 and 4, three such legs 44 are illustrated. It is to be understood that more legs 44 could be utilized if such was desired or required, the number of such legs 44 not being a functional limitation of the present invention.

Attachable to the upper tank flange 18 is a tank cover or lid 20. The lid 20 includes a lid perimeter 22, a top lid surface 24 and a lid underside surface 26. In the preferred embodiment, the lid 20 is constructed of a special polymar plastic material which provides strength, durability and electrical nonconductivity. The significance of this electrical nonconductive, or electrical insulating, feature will become apparent later in this detailed description. The lid 20 is attachable to the upper tank portion 14 by means of a plurality of fasteners 86, such as bolts, which are installed about the lid perimeter 22 and through the upper tank flange 18. See FIGS. 2 and 3. Here again, the number of such fasteners 86 is not a functional limitation of the present invention. The number of fasteners 86 may be varied without deviating from the scope of this invention. The important feature of the fasteners 86 is that they prevent the lid 20 from coming away from the tank 12 and that they prevent rotation of the lid 20 about the tank 12.

Sealingly attached to the lower tank portion 16 is an elliptical head 34. The lowermost portion of the head 34 includes a centrally located bottom aperture 38. Attached to the aperture 38 is a bottom flange 40. Attached to the bottom flange 40 is an elbow 48 which includes a first flanged end 92, a discharge sampling valve 94, and a second end 96. Attached to the second end 96 is a ball valve 97, an inline flow meter 98 and a discharge pipe 99 through which tank discharge flow 8 is accomplished. The flow meter 98 may be wired to control inlet flow.

Attached to the underside 26 of the lid 20 are a number of functionally cooperating electrodes 50, 60. As shown in the preferred embodiment, one anode 50 and one cathode 60 is provided. It is to be understood that the number of such electrodes 50, 60 is not a functional limitation of the present invention. Other combinations could be provided, such as two anodes and two cathodes, and so on, without deviating from the scope of the present invention. As shown, the anode 50 and the cathode 60 are each fabricated in the shape of a rectangular prism. In the preferred embodiment, the anode 50 is made of silver as is the cathode 60. Again, the material from which each of the electrodes 50, 60 is made is not a limitation of the present invention, other than that the materials used must be functionally conducive to the process of electrolysis. The use of like material for the electrodes 50, 60 allows an electronic polarity reverser (not shown) to be used which reduces the rate of oxide buildup on the silver anode 50 which, in turn, reduces the time between scheduled anode cleanings.

The anode 50 includes a top anode portion 52, a central anode portion 54, a bottom anode portion 58, and a pair of anode faces 56, the anode faces 56 being generally parallel to one another and providing the greatest surface area of the anode 50. Similarly, the cathode 60 includes a top cathode portion 62, a central cathode portion 64, a bottom cathode portion 68, and a pair of cathode faces 66. The anode 50 is attached to the lid underside 26 by means of a plurality of anode fasteners 102. See FIG. 2. Similarly, the cathode 60 is attached to the lid underside 26 by means of a plurality of cathode fasteners 104. At the bottom portion 58 of the anode 50 and the bottom portion 68 of the cathode 60 is a stabilizing element 90. The stabilizing element 90 is functionally adapted to maintain the electrodes 50, 60 in substantially parallel planar relationship. In this parallel planar relation, the plane defined by each electrode 50, 60 is substantially parallel to the axis of the inlet pipe 30. See FIGS. 2 and 3. As shown, one of the anode fasteners 102 is attached to a positive electrical lead 112 through which an electrical current may flow. Similarly, one of the cathode fasteners 104 is attached to the cathode 60 and is also attached to a negative, or grounding, lead 114. An electrical potential or voltage may be applied across the anode lead 112 and the cathode lead 114 and, therefore, across the anode 50 and across the cathode 60. In the preferred embodiment, a power supply on the order of several hundred watts may be applied to achieve the electrochemical process of electrolysis across the electrodes 50, 60.

The upper tank portion 14 also includes an inlet pipe 30 that provides a continuum with the interior 80 of the containment tank 12. As shown, the flow path 2 through the inlet pipe 30 is generally perpendicular to the axis of the tank interior 80. The tank 12, the elliptical head 34 and the inlet pipe 30 are functionally cooperative to allow water flow 2 through the inlet 30, into the tank interior 80 in a whirlpool-like or double vortex flow 4, and out the bottom aperture 38 of the head 34 in a discharge flow 6. See FIGS. 2 and 3. The significance of this flow pattern will become apparent later in this detailed description. The containment tank 12 also includes a sight glass aperture (not shown) defined within the wall 13 of the tank 12. Attached to the aperture is a sight glass flange 82 and a sight glass 84. The purpose of the sight glass 84 is to provide visual access to the tank interior 80.

In application, water flow 2 is initiated to the interior 80 of the tank 12 by means of an inlet pipe 30. In this fashion, water enters the tank interior 80 and is directed to forcibly flow between the electrodes 50, 60. Upon exiting the area between the electrodes 50, 60, the water follows the annular wall surface 13 in a whirlpool-like or turbulent double vortex-type fashion. That is, the water flow is effectively "split" at that portion of the wall surface 13 immediately opposite the inlet and continues in two opposite directions back around the electrodes 50, 60 and along the wall surface 13. This double vortex turbulence facilitates the electrolysis process and the migration of silver ions away from the anode 50 and away from the cathode 60 before the ions have a chance to attach themselves to the cathode 60 thus defeating the purpose of ionic water treatment. The flow 4 continues about the electrodes 50, 60 until the water flow 6 discharges through the head aperture 38, the water being properly ionized at this point. The elliptical head 34 and the aperture 38 defined in it serves a "self-cleaning" function by discharging suspended solids contained within the flow stream 6. The water ionization at this point of discharge serves to control algae, nuisance invertebrates, microorganisms and inorganic salts lurking in other parts of the water system within which the ion generator assembly 10 of the present invention is incorporated. As the eletrolysis process continues, the electronic polarity reverser (not shown) cycles at reversing rates from 0.1 second to 1,000 minutes depending on rates of reversal deemed appropriate for a specific site operation. Gradually, the anode 50 effectively becomes used up as ions are given up to the water flow 4. The sight glass 84 allows the user to view the containment tank interior 80 to determine if anode wastage has occurred to the point that the anode 50 must be replaced. Replacement of the anode 50 is easily accomplished by removal of the tank lid 20, detachment of the anode lead 112, withdrawal of the anode fasteners 102, insertion of a new anode 50, replacement of the anode fasteners 102, reattachment of the anode lead 112 and reseating of the lid 20.

From the foregoing description of the illustrative embodiment of the invention set forth herein, it will be apparent that there has been provided an improved method and apparatus for exposing the water flow within a water system to an ion generation device wherein water velocity is increased between the electrodes of the ion generator; where a perpendicular inlet is provided to create a high velocity vortex flow within the system in the vicinity of the ion generator electrodes and which avoids "dead zones," or areas where water velocities in the vicinity of the ion generator electrodes are low; where a non-electrical conducting head is used to mount the electrodes of the ion generator and where a plurality of cooperatively alternating anodes and cathodes may be used; where a discharge valve is provided to control the system water level within the ion generator thereby maintaining a minimum vertical velocity within the system; where a self-cleaning elliptical or conical base to the flow tank is provided; and where a sight glass is utilized to allow for visual inspection of anode wastage.

What is claimed is:

1. In an apparatus for generating ions within a water system whereby fouling of the system by algae, nuisance invertebrates, microorganisms and inorganic salts is prevented, which apparatus has a water containment tank, said tank including a generally cylindrical tank interior having an upper tank portion and a lower tank portion, means for outletting water from said tank, and an ion generating means disposed within said tank interior, the improvement comprising an inlet pipe which is disposed generally perpendicularly to the upper portion of said tank interior, wherein said containment tank includes a tank aperture situated at said tank upper portion whereby said tank interior is made accessible through said aperture, a cover member that is functionally adapted to sealingly enclose said tank aperture, said cover member made of an electrically nonconductive material, a side wall and a sight glass defined within said tank side wall whereby the tank interior may be visualized, wherein said ion generating means includes at least one anode and at least one cathode, means for attaching the at least one anode and the at least one cathode to said tank cover member in proximal spatial relation whereby ions are generated therebetween when an electrical potential is applied across the at least one anode and the at least one cathode, and electronic circuitry for periodically reversing polarity of said at least one anode and said at least one cathode, and wherein said at least one anode and said at least one cathode are each configured as a plate-like rectangular prism, said at least one anode and said at least one cathode are placed in generally parallel planes relative to each other, and said at least one anode and said at least one cathode are oriented in relation to said inlet pipe water flow whereby water flow between said at least one anode and said at least one cathode is maximized and whereby water flow from between said at least one anode and said at least one cathode creates a double vortex flow pattern along said containment tank side wall.

2. A method for generating ions within a water system whereby fouling of the system by algae, nuisance invertebrates, microorganisms and inorganic salts is prevented comprising the steps of providing a water containment tank, said tank including a generally cylindrical tank interior, an upper tank portion and a lower tank portion, providing a containment tank side wall and a sight glass defined within said tank side wall whereby the tank interior may be visualized, providing a tank aperture situated at said tank upper portion whereby said tank interior is made accessible through said aperture, providing a cover member to sealingly enclose said tank aperture, said cover member made of an electrically nonconductive material, providing an inlet pipe which is disposed generally perpendicularly to the upper portion of said tank interior whereby water is introduced to the tank interior in a turbulent vortex manner, inletting water to said tank interior, flowing water through said tank interior, outletting water from said tank interior, generating ions within said tank interior whereby ions are introduced into the water flow within said tank interior, said ion generating step including providing at least one anode and at least one cathode and attaching the at least one anode and the at least one cathode to said tank cover member in proximal spatial relation whereby ions are generated therebetween when an electrical potential is applied across the at least one anode and the at least one cathode, and providing electronic circuitry for providing periodic polarity reversal between said at least one anode and said at least one cathode, and configuring the said at least one anode and said at least one cathode as a plate-like rectangular prism, placing the said at least one anode and the said at least one cathode in generally parallel planes relative to each other, and orienting the said at least one anode and said at least one cathode in relation to said inlet pipe water flow whereby water flow between said at least one anode and said at least one cathode is maximized and whereby water flow from between said at least one anode and said at least one cathode creates a double vortex flow pattern along said containment tank side wall.

* * * * *